(No Model.)
A. EICHHORN.
HYDROMETER.
No. 442,962. Patented Dec. 16, 1890.
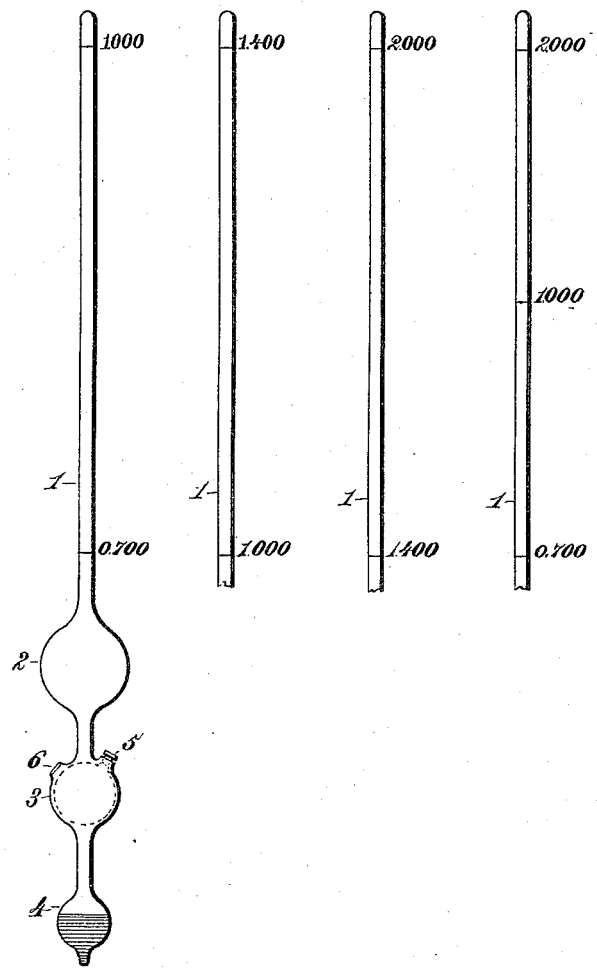
Witnesses.
Robert Emett,
J. A. Rutherford.
Inventor.
August Eichhorn,
By James L. Norris
Atty.

UNITED STATES PATENT OFFICE.

AUGUST EICHHORN, OF DRESDEN, GERMANY, ASSIGNOR TO HIMSELF AND RICHARD FASPERT, OF SAME PLACE.

HYDROMETER.

SPECIFICATION forming part of Letters Patent No. 442,962, dated December 16, 1890.

Application filed April 30, 1890. Serial No. 350,082. (No model.) Patented in Germany June 1, 1889, No. 49,683.

*To all whom it may concern:*

Be it known that I, AUGUST EICHHORN, mechanic, of Dresden, No. 6 Seiler Street, a citizen of Germany, residing at Dresden, in the Kingdom of Saxony, have invented certain new and useful Improvements in Specific-Gravity Instruments, (for which I have obtained a patent in Germany, No. 49,683, dated June 1, 1889;) and I do hereby declare the following to be a full, clear, and exact description of the invention, such as will enable others skilled in the art to which it appertains to make and use the same.

This invention relates to an improvement in instruments for ascertaining the specific gravity of liquids and gases; and it consists in a hydrometer provided with a permanent picnometer-flask having on one side a glass-stoppered funnel that is counterbalanced on the opposite side of said flask by a projection cast onto the said flask, so that the instrument will float in an upright position.

The invention is illustrated in the annexed drawings, in which—

Figure 1 is an elevation of my improved specific-gravity instrument. Figs. 2, 3, and 4 are views of the stem only, showing how it may be graduated for specific weights either lighter or heavier than water, or for both together.

Referring to the drawings, the numeral 1 designates a graduated stem, on the lower end of which is a float 2, from which depends a picnometer or thin glass flask 3 of a certain definite capacity. Beneath the flask 3 and connected therewith is a bulb 4, containing mercury or other suitable material to weight the instrument and cause it to sink a definite distance in distilled water at normal temperature.

The picnometer-flask 3 is an inclosed glass shell having no communication with the other parts of the instrument, and is to be completely filled with the liquid or gas to be tested. In order to give access to the interior of this flask 3, it is provided on one side with a glass-stoppered nozzle or funnel 5, which is counterbalanced on the opposite side of the flask by a solid projection or drop-eye 6, that is cast onto the glass for the purpose of causing the instrument to float upright. The entire instrument is preferably made of glass, though it may be constructed wholly or in part of light sheet metal or other suitable material.

The divisions of the scale on the stem 1 may be graduated for specific weights less than one, (water,) as shown in Fig. 1, or for weights greater than one, as shown in Figs. 2 and 3, or for both, as shown in Fig. 4. The instrument may be graduated according to any well-known scale with distilled water at, say, 15° centigrade as a standard.

In using the instrument to determine the specific gravity of small quantities of liquid or gas, the flask 3 is filled with the fluid under examination and the hermetically-fitting glass stopper is then inserted, so that no air-bubbles will be formed. On now immersing the entire instrument in distilled water, the specific gravity of which in the picnometer is of greater specific gravity than water, the instrument will sink to a greater depth than the point on the scale indicating the specific gravity of water, while if the fluid under examination has a specific gravity less than water the instrument will not sink so far. As the water in which the instrument is immersed and the fluid in the picnometer are at substantially the same temperature, no troublesome calculations are needed, and the specific gravity can be read off at once from the scale.

This instrument is especially adapted to the examination of small quantities of liquid in which an ordinary hydrometer could not be immersed. It is also adapted to the examination of gases, of corrosive acids that require to be inclosed in a glass vessel, and of light powders and other materials that would readily dissolve and be lost if tested by ordinary means.

What I claim as my invention is—

1. The herein-described specific-gravity instrument, consisting of the hydrometer having the picnometer-flask 3, depending from the float and provided on one side with a stoppered nozzle, substantially as shown and described.

2. The herein-described specific-gravity instrument, consisting of the graduated stem 1, the float 2, the picnometer-flask 3, depending from said float and provided with the stoppered nozzle 5, and the weight 4, depending from said flask, substantially as shown and described.

In testimony whereof I affix my signature in presence of two witnesses.

AUGUST EICHHORN.

Witnesses:
CARL FR. REICHELL,
PAUL DRUCKMÜLLER.